(12) United States Patent
Bezos et al.

(10) Patent No.: US 11,188,104 B1
(45) Date of Patent: Nov. 30, 2021

(54) REPLACEMENT OF AN ELECTRO-MECHANICAL THERMOSTAT

(71) Applicant: Pulse IQ LLC, Berlin, MD (US)

(72) Inventors: Angel P. Bezos, Berlin, MD (US); Emilio A. Fernandez, Berlin, MD (US)

(73) Assignee: PULSE IQ LLC, Berlin, MD (US)

( * ) Notice: Subject to any disclaimer, the term of this patent is extended or adjusted under 35 U.S.C. 154(b) by 10 days.

(21) Appl. No.: 16/878,745

(22) Filed: May 20, 2020

(51) Int. Cl.
*G05D 23/19* (2006.01)
*G05D 23/32* (2006.01)

(52) U.S. Cl.
CPC ......... *G05D 23/32* (2013.01); *G05D 23/1913* (2013.01); *F25B 2600/112* (2013.01)

(58) Field of Classification Search
CPC ............... G05D 23/19; G05D 23/1913; G05D 23/1917; G05D 23/32; F25B 2600/112
See application file for complete search history.

(56) References Cited

U.S. PATENT DOCUMENTS 7,434,744 B2 * 10/2008 Garozzo .................. F24F 11/30 236/51
10,048,708 B2 * 8/2018 Fernandez ............ H02M 7/068
10,353,412 B2 * 7/2019 Fernandez ............ H02M 7/068
10,893,595 B2 * 1/2021 Taipale .................. H05B 45/10
2008/0073440 A1 3/2008 Butler et al.

FOREIGN PATENT DOCUMENTS

WO      2011/006292 A1    1/2011

* cited by examiner

*Primary Examiner* — Marc E Norman
(74) *Attorney, Agent, or Firm* — W&C IP

(57) ABSTRACT

An electronic thermostat replaces an electro-mechanical thermostat and is located in a different location from the blower motor it controls. The electronic thermostat controls the blower motor on the same wires from which the thermostat receives power. The safe, low voltage power supply that powers the electronic thermostat is located at the blower motor location and is housed in the Blower Motor Module (BMM). This configuration has the advantage that it removes a bulky and space consuming component from the thermostat, the A/C transformer. This also reduces the amount of power (heat) dissipated by the electronic thermostat power supply, thus reducing a source of potential temperature measurement inaccuracies. Also, removing the 120 VAC power from the thermostat and replacing it with an isolated low voltage source increases safety. This architecture also makes the necessary over the power wires communications less complex and safter, and it reduces the number of components necessary to accomplish the communication's link, and makes the link more robust and noise immune.

9 Claims, 2 Drawing Sheets

REPLACEMENT OF AN ELECTRO-MECHANICAL THERMOSTAT

BACKGROUND OF THE INVENTION

Field of the Invention

The present invention generally relates to electronic thermostat installations that replaces electro-mechanical thermostats, and, where the only two wires available to connect the electronic thermostat have to be used for the dual purpose of providing power to the electronic thermostat and also to control the remotely located blower motor. The blower motor control can be binary (on/off) or analog (i.e., variable blower motor speed).

Background Description

Prior art mechanical or mercury bulb type thermostats are used in many apartment buildings, houses and industrial installations. These devices do not use any electrical power to operate and perform their temperature control function by mechanical means using temperature sensitive mechanical devices that move in order to close an electrical contact, which usually drives directly a load such as a fan motor or other similar HVAC device or a relay that then drives such devices. When these mechanical type thermostats are replaced by modern electronic thermostats, there is a problem of how to power the electronic thermostat. The prior art choices available to overcome the lack of power problem include running an extra wire which is usually prohibitively expensive, or other means such as batteries which have many drawbacks including the labor costs of replacing the batteries, or means like the method described in the Fernandez et al. patents as explained below.

U.S. Pat. No. 10,353,412 and 10,048,708 to Fernandez et al. describe methods to obtain a relatively small amount of power from an existing mechanical thermostat installation to provide power to an electronic thermostat that replaces a mechanical thermostat (usually mercury switch type) that does not require any power to operate and thus does not have a return wire for the 120 VAC. Such a mechanical thermostat simply switches the "hot" 120 VAC wire, which then usually directly energizes the air blower motor. Thus, in these mechanical thermostat installations there are two wires connected to the mechanical thermostat, the "hot" 120 VAC wire coming in and the switched (by the thermostat) 120 VAC "hot" wire going out to the blower motor. The other side of the blower motor is connected to the 120 VAC neutral thus completing the circuit.

The methods implemented in the Fernandez et al. systems obtain power by circulating a relatively small amount of current (milliamps) through the blower motor when the motor is off, this small amount of current does not affect the motor and powers a 120 VAC transformer that thus obtains a small amount of power. When the motor is "on", power is obtained by circulating the motor current through a current transformer and thus obtaining the necessary power. The voltage drop across the current transformer and also the power taken in this manner is kept small enough so that the effect on the motor is negligible.

The Fernandez et al. system works well as long as the power taken is small relative to the load (i.e., the motor) and as long as the load (i.e., the amount of current drawn by the motor) is kept within certain limits. That is, the motor current that can be handled this way is limited to a certain range that the power converting circuit can handle and that will not affect the operation of the motor. This range is also substantially limited by the necessity of keeping power dissipation inside the thermostat (which is where the power supply resides) as low as possible so that it does not affect the thermostat's room temperature measurement and also by the very stringent thermostat size constraints. The need for the present invention arises because there are applications in which the current range that needs to be handled is higher than what the Fernandez et al. system can handle. As an example, there are applications which employ blower motor speed controls that vary the speed of the motor from Low to Medium to High. These controls are independent of the thermostat. In the Low setting the motor current is reduced to a point that it is quite challenging to handle, especially since there are very demanding space/size and power dissipation constraints for the thermostat power supply. These requirements are driven by the desirability and practical necessity for both the electronics and the power supply in the electronic thermostat to fit inside a standard electrical junction box, which is the way that mechanical Thermostats are mounted. So, the size and power dissipation of the power supply are very important. For all of the above reasons an approach that can generate the needed power independent of the motor current and that reduces the size and power dissipation of the thermostat power supply is highly desirable.

SUMMARY OF THE INVENTION

It is an object of the present invention to provide a system that replaces existing electro-mechanical thermostat installations with modern electronic thermostats and that supplies the necessary power to the electronic thermostat in a way that is independent of the blower motor current, and that at the same time reduces the size of the power supply components that are housed inside the electronic thermostat's enclosure, and that also reduces the total amount of power dissipated by the electronic thermostat power supply.

According to the invention, the replacement electronic thermostat is disconnected from the blower motor. The thermostat is powered by a low voltage, usually 12 VDC, supply and the thermostat communicates with the blower motor via a current pulse signal. More particularly, there is 120 VAC to low voltage (e.g., 12 VDC) power supply in the Blower Motor Module (BMM). This has the advantages that it removes a very bulky and space consuming part from the thermostat, the A/C Transformer. It also reduces the overall power generated by the thermostat power supply. Also having the thermostat powered from a low voltage power supply that is isolated from the 120 VAC increases safety. This reduces the size and number of components that reside in the thermostat, since now the voltage reaching the thermostat is a safe low voltage and it allows for a less complex, simpler and less costly method of communication from the thermostat to the blower motor box. As an example, the thermostat can simply generate a short high current pulse in the low voltage lines. This pulse is easily detected in the blower motor box and the information used to turn the blower motor "on" and "off" on command from the thermostat. This short high current pulse is at a current level much higher than the worst case current demand of the thermostat. The additional circuitry needed in the thermostat to produce this pulse is very simple, very cost effective and requires very few and readily available, standard and inexpensive components.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION THE INVENTION

Figure 1:
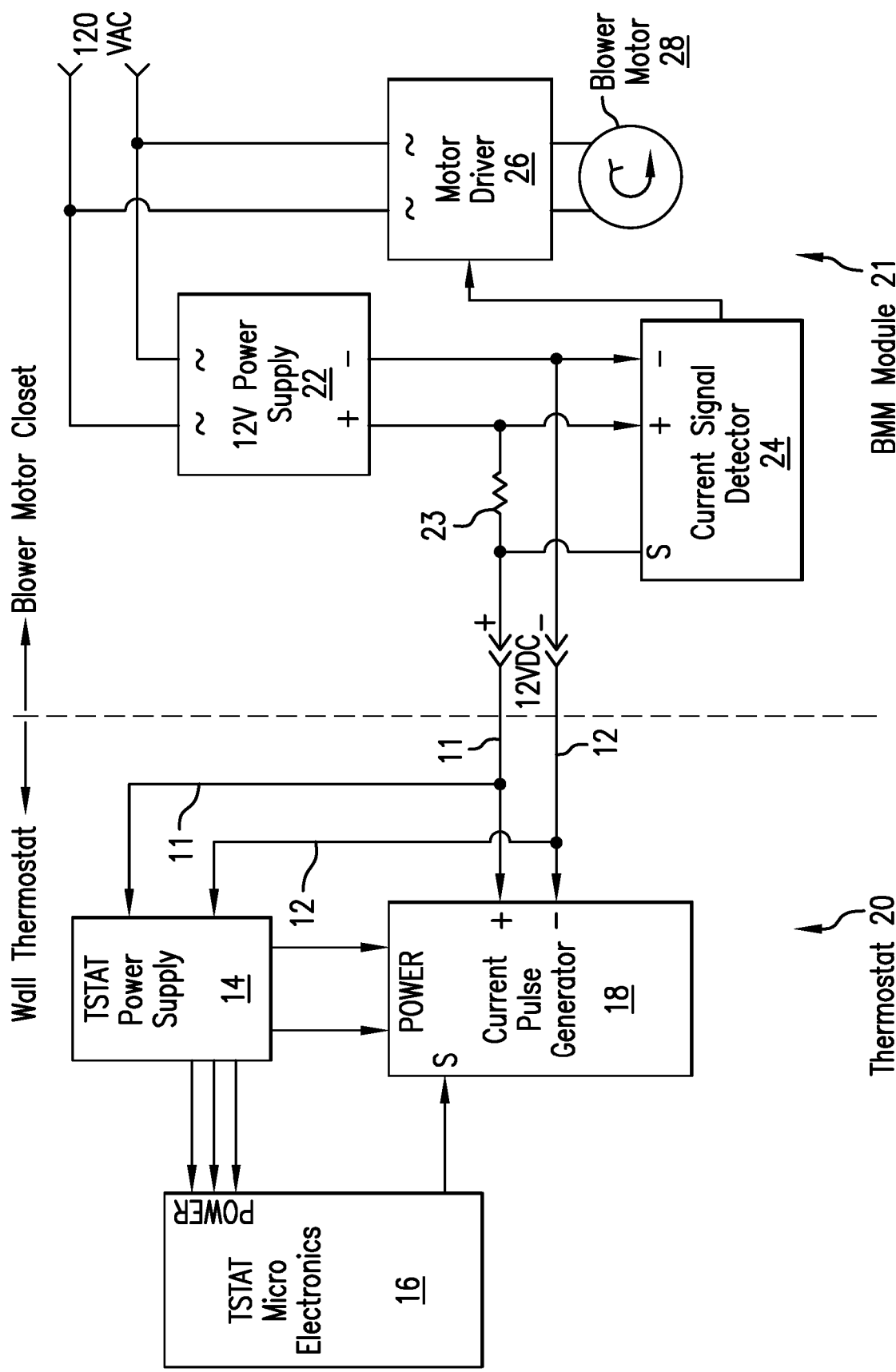
FIG. 1 is a block and schematic diagram of one embodiment of the present invention.

As shown in FIG. 1, the electronic thermostat installation is divided into two parts, the wall thermostat 20 and the Blower Motor Module (BMM) 21. The 12 VDC power supply for the thermostat is generated in the BMM 21 by the 120 VAC to 12 VDC converter 22 in the Blower Motor Module (BMM). This has the advantages that it removes a very bulky and space consuming part from the thermostat, the A/C transformer. The 12 VDC is supplied to the thermostat by two wires 11 and 12. The two wires 11 and 12 are simply the wires originally connected between the electromechanical thermostat and the blower motor. These two wires are disconnected at both locations during the installation process of the electronic thermostat and then connected as follows. The thermostat power supply 14 receives the 12 VDC on the wires 11 and 12 and generates the required voltages that power the thermostat micro-electronics 16. The wires 11 and 12 are also connected to a current pulse generator 18 which is also powered by the thermostat power supply 14. A control signal generated by the thermostat micro-electronics 16 is output to the current pulse generator 18 when the thermostat micro-electronics 16 determines that the blower motor should turn on. In response, the current pulse generator 18 produces current pulses on the wires 11 and 12. As a non-limiting example, one possible current pulse can be a 20 milliseconds, 100 milliamp pulse every second, whenever the thermostat commands the blower motor to be "on".

The current pulses generated by the current pulse generator 18 on lines 11 and 12 are received by current signal detector 24 located in the BMM 21. The current signal generator is also powered by the 120 VAC to 12 VDC converter 22 in the Blower Motor Module (BMM). A current sensing resistor 23 is connected between the 120 VAC to 12 VDC converter and the line 11. The very small voltage (e.g., millivolts) across the current sensing resistor 23 is sensed by the current signal detector 24. Upon detecting the high current signal pulses, the current signal detector generates a control signal to a motor driver 26 which causes the blower motor 28 to turn on. When the pulses from the current pulse generator 18 cease, the control signal from the current signal generator to the motor driver 26 turns "off" causing the blower motor 28 to turn "off". While a current sensing resistor 23 is employed in this embodiment, those skilled in the art understand that other current sensing means could be employed.

This embodiment has several advantages. First, it reduces the size and number of components that reside in the thermostat. Second, now the voltage reaching the thermostat is a safe, non-lethal low voltage. Third, it allows for a less complex, simpler, more robust, and less costly method of communication from the thermostat to the blower motor box. As an example, the thermostat could simply generate a short high current pulse in the low voltage lines. This pulse is easily detected in the blower motor box and the information used to turn the blower motor "on" and "off" on command from the thermostat. The short high current pulses would be at a current level much higher than what the worst case current that the electronic thermostat can demand. The additional circuitry needed in the thermostat to produce this pulse is very simple, very cost effective and requires very few and readily available, standard and inexpensive components.

The BMM 21 would also have a relay or solid-state blower motor driver 26. A fourth advantage of this embodiment is that it requires no matching of the thermostat to BMM as might be required with standard digital 120 VAC power modem approach. Also, the signal is low frequency, self-contained, and very unlikely to be affected by any other electronic signals or noise in the 120 VAC wires or by any nearby RF source. Noise in the 120 VAC line interfering with and causing errors in a communications link that use the 120 VAC line, like the X10 communications protocol, are well known and well documented. Thus, from the signal interfering with any other system, or any other system or noise interfering with this signal point of view, this embodiment is extremely robust.

A further refinement of this technique could be used to transmit analog information from the thermostat 10 to the BMM 20. The frequency of the pulses could vary from exactly one second apart to exactly ½ a second apart, where 1 second would be zero and ½ a second would be 100%. This could be easily decoded by the current signal detector 24 and used for, as an example, to change the speed of the blower motor 28 on command from the thermostat.

Figure 2:
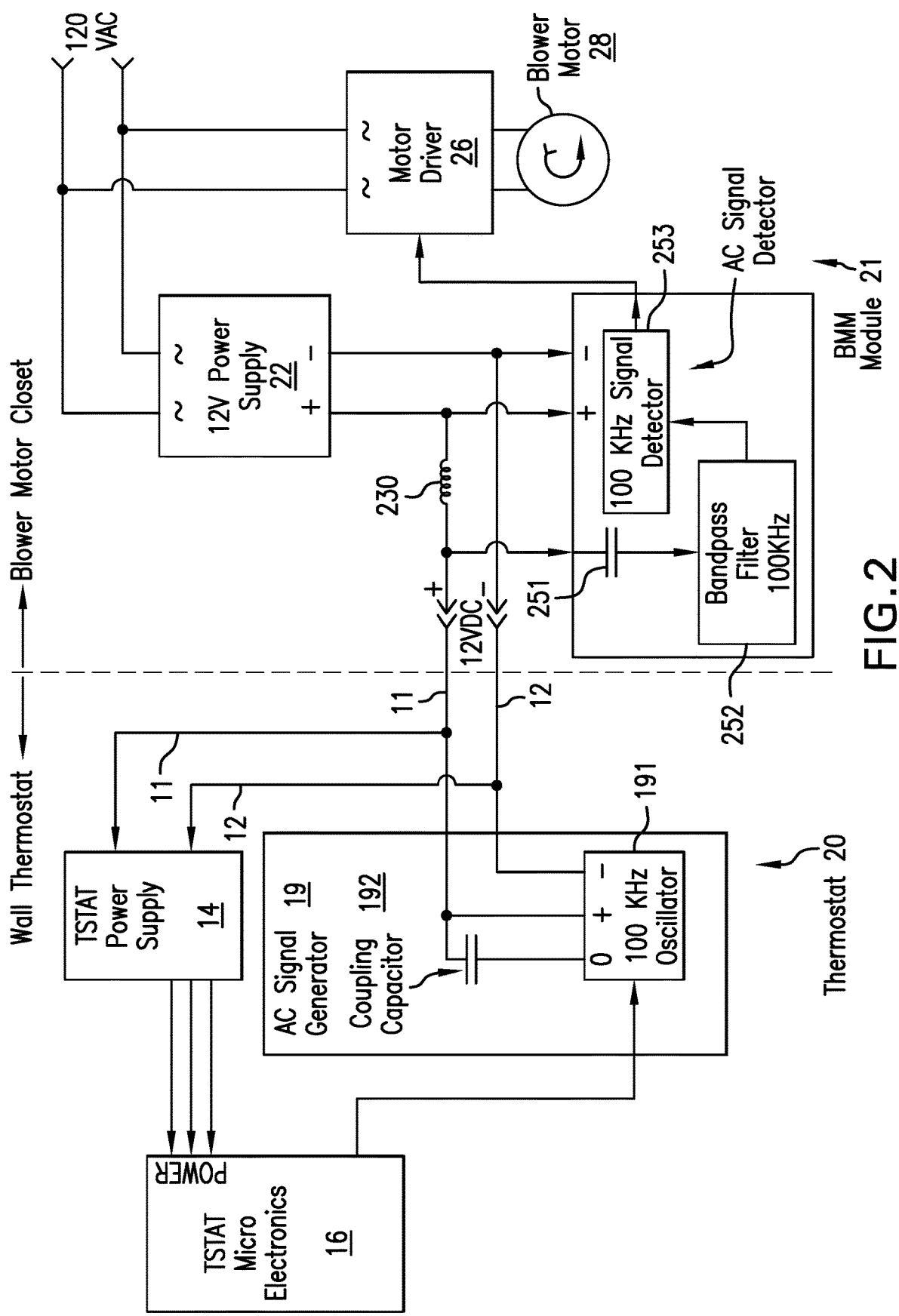
FIG. 2 is a block and schematic diagram of a variation of the embodiment shown in FIG. 1

FIG. 2 shows a variation of the embodiment shown in FIG. 1. This is essentially the same as the embodiment described above but rather than current pulses to convey the blower motor "on/off" signal, a relatively high frequency signal (20 kHz to 200 kHz) is superimposed on the low voltage (12V) wires. As shown in FIG. 2 the current pulse generator 18 is replaced by an AC signal generator 19 comprising a 100 kHz oscillator 191 powered by the 12 VDC on lines 11 and 12. The oscillator 191 is turned on and off by the control signal generated by the thermostat micro-electronics 16. The output 100 kHz signal from the oscillator 191 is passed by coupling capacitor 192 to line 11. At the BMM 21, the signal detector 24 is replaced with an AC signal detector 25. The AC signal detector comprises a coupling or high pass capacitor 251 which passes the 100 kHz signal on line 11 to a bandpass filter 252 which acts as a notch filter to selectively pass the 100 kHz signal. This signal is received by a 100 kHz signal detector 253 which generates the control signal to the motor driver 26. Also, as shown in FIG. 2, the current sensing resistor 23 is replaced by an inductor 230. The inductor 230 prevents the power supply 22 from attenuating the AC signal in the line 11 wire. Inductor 230 presents a high impedance to the oscillator frequency or frequencies.

This variation is a bit more complex than the basic embodiment described with reference to FIG. 1. It is however a very viable embodiment. While the signal used in this example is 100 kHz, those skilled in the art understand that other frequencies inside or outside the 20 kHz to 200 kHz range mentioned in this embodiment could be used. Also, analog information could be transmitted by using a variable frequency oscillator in place of the fixed frequency oscillator 191 and modifying the signal detector 25 to receive and decode the variable oscillator frequency.

The invention claimed is as follows:

1. An electronic thermostat installation comprising:
an electronic thermostat that controls a blower motor and that is independent of the blower motor current;

a blower motor module (BMM) including a motor driver, the motor driver providing alternating current (AC) power to the blower motor upon receipt of a command signal;
a power supply located in the BMM and supplying power to the electronic thermostat on two wires;
a thermostat power supply in the electronic thermostat and connected to the two wires for generating power supply voltages for the electronic thermostat;
thermostat micro-electronics in the electronic thermostat powered by the power supply voltages from the thermostat power supply, the thermostat micro-electronics generating control signals for controlling the blower motor;
a signal generator in the electronic thermostat responsive to control signals from the thermostat micro-electronics for producing signals on the two wires;
a signal detector in the BMM responsive to the signals produced by the signal generator in the electronic thermostat for generating motor control signals to the motor driver.

2. The electronic thermostat installation of claim 1, wherein the signal generator in the electronic thermostat produces current pulses in response to control signals from the thermostat micro-electronics, the signal detector in the BMM responding to the current pulses to generate the motor control signals.

3. The electronic thermostat installation of claim 2, wherein analog information is transmitted from the thermostat to the BMM by varying the frequency of the current pulses.

4. The electronic thermostat installation of claim 3, wherein the analog information is used to control the speed of the blower motor on command from the thermostat, wherein the signal detector in the BMM is responsive to the frequencies of the current pulses, and the resulting analog signal form from the signal detector drives an analog type motor driver that controls the speed of the blower motor in accordance with the current pulses frequency.

5. The electronic thermostat installation of claim 3, wherein the current pulses vary from one second apart to ½ a second apart, where 1 second is zero and ½ a second is 100% or vice versa, the speed of the blower motor being controlled within the range of zero to 100%.

6. The electronic thermostat installation of claim 1, wherein the signal generator in the electronic thermostat produces an signal in response to control signals from the thermostat micro-electronics, the signal detector in the BMM responding to the signal to generate the motor control signals.

7. The electronic thermostat installation of claim 6, wherein the signal is generated by an oscillator in the signal generator, the signal being coupled to the two wires and detected by the signal detector.

8. The electronic thermostat installation of claim 7, wherein the oscillator in the signal generator is a fixed frequency oscillator and the signal is a constant frequency signal from the oscillator.

9. The electronic thermostat installation of claim 7, wherein the oscillator in the signal generator is a variable frequency oscillator (VFO) which provides signals of different frequencies conveying analog information that can be used for variable speed control of the blower motor.

* * * * *